United States Patent [19]

Hundal et al.

[11] Patent Number: 4,461,317

[45] Date of Patent: Jul. 24, 1984

[54] OVERFLOW CONTROL VALVE

[75] Inventors: Rolv Hundal, Hempfield; Boyd A. Kessinger, Murrysville; Edward A. Parlak, North Huntingdon, all of Pa.

[73] Assignee: The United States of America as represented by the United States Department of Energy, Washington, D.C.

[21] Appl. No.: 251,647

[22] Filed: Apr. 6, 1981

[51] Int. Cl.³ .............................................. F16L 29/00
[52] U.S. Cl. ................................... 137/565; 137/315; 137/575; 137/576; 251/149.2; 251/149.9; 285/9 R
[58] Field of Search ................... 285/9 R, 19, 20, 325; 251/149.2, 150, 325, 149.9, 305; 137/315, 565, 576, 577, 575; 277/13, 14 R, 14 V, 135; 417/424

[56] References Cited

U.S. PATENT DOCUMENTS

| 2,099,992 | 11/1937 | Sutcliffe | 251/325 |
| 2,824,755 | 2/1958 | Lamphear | 251/149.2 |
| 3,089,677 | 5/1963 | Savaria | 251/325 |
| 3,227,475 | 1/1966 | Sinkinson | 285/9 R |
| 3,298,680 | 1/1967 | Jablin | 285/9 R |
| 3,713,623 | 1/1973 | Pearson | 251/150 |
| 4,037,819 | 7/1977 | Kindersley | 251/305 |
| 4,116,418 | 9/1978 | Pearson et al. | 251/150 |
| 4,156,530 | 5/1979 | Rivkin et al. | 277/135 |
| 4,181,150 | 1/1980 | Maldavs | 251/149.9 |
| 4,236,721 | 12/1980 | Pennock | 277/14 V |
| 4,330,031 | 5/1982 | Shefsiek | 285/9 R |

Primary Examiner—A. Michael Chambers
Attorney, Agent, or Firm—Z. L. Dermer

[57] ABSTRACT

An overflow control valve for use in a liquid sodium coolant pump tank which valve can be extended to create a seal with the pump tank wall or retracted to break the seal thereby accommodating valve removal. An actuating shaft which controls valve disc position also has cams which bear on roller surfaces to force retraction of a sliding cylinder against spring tension to retract the cylinder from sealing contact with the pump tank.

1 Claim, 7 Drawing Figures

OVERFLOW CONTROL VALVE

This invention was conceived during performance of a contract with the U.S. Government designated ANL 31-109-38-5001.

BACKGROUND OF THE INVENTION

This invention relates to valves used to control fluid streams, especially overflow control valves for hot liquid sodium flow.

Coolant pumps associated with liquid sodium fast breeder reactors are located inside a pressure boundary tank. Due to leakage around the pump shaft seals, an upper section of the tank is filled with hot liquid sodium. Leakage into the upper pump tank is continuous during pump operation. A steady, safe liquid sodium level in the tank is maintained by an overflow control valve which, if set properly, allows sodium flow equal to sealleakage flow to return to the pump suction via an overflow line. The purpose of the overflow control valve is to adjustably orifice the overflow line such that a safe liquid level in the tank is achieved.

Location of the overflow control valve within the tank is desired since the valve stem seal may then be in a cover gas/sodium vapor region rather than under liquid.

The overflow control valve should be easily removable from the tank for maintenance and inspection, but the valve must maintain a good seal with the tank wall during operation despite pump induced vibrations in the valve and tank.

It is desired to provide an easily removable overflow control valve with a sealing mechanism responsive to vibrations between the valve and a tank wall or seat, suitable for high temperature applications.

SUMMARY OF THE INVENTION

An overflow control valve is disclosed which adjusts the orifice size of an overflow line by the variable position of a butterfly-type disc. A seal between the valve and a seal surface is accomplished by a seat on a valve cylinder which is spring loaded to bear against the overflow nozzle seal surface of the tank in opposition to tank and valve vibration or movement. An actuating shaft which controls the position of the butterfly disc also has cams which, during a certain range of the circular arc of travel of the actuating shaft, cause the valve cylinder to retract away from the overflow nozzle seal surface thereby reducing overall valve length and possibly disengaging valve retention devices. This enables easy valve removal from the tank.

DETAILED DESCRIPTION

Figure 1:
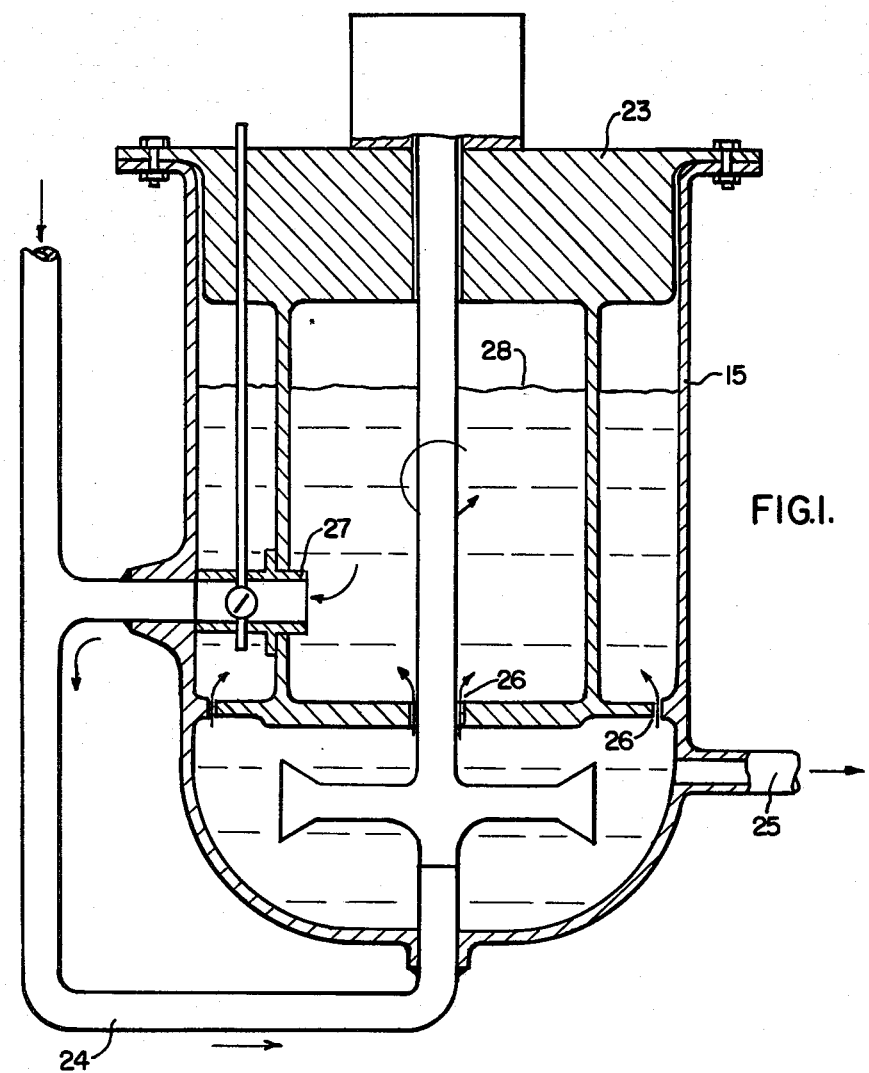
FIG. 1 is a schematic of a sectioned view of the pump tank and components.

The following description relates to a preferred embodiment of an overflow control valve designed to adjust hydraulic impedance, in this case from 3.6 to 6.1 psi for an overflow of up to 3,000 gpm for a liquid sodium breeder reactor pump of 85,000 gpm capacity. The general arrangement is illustrated in FIG. 1 which shows a pump 23 located within pump tank 15. Inlet line 24 delivers liquid sodium to the suction side of the pump which has a discharge pipe 25. Leakage of sodium passing seals 26 fills pump tank 15. Overflow valve 27 maintains a safe level 28 in tank 15 by returning overflow to inlet line 24.

Figure 2:
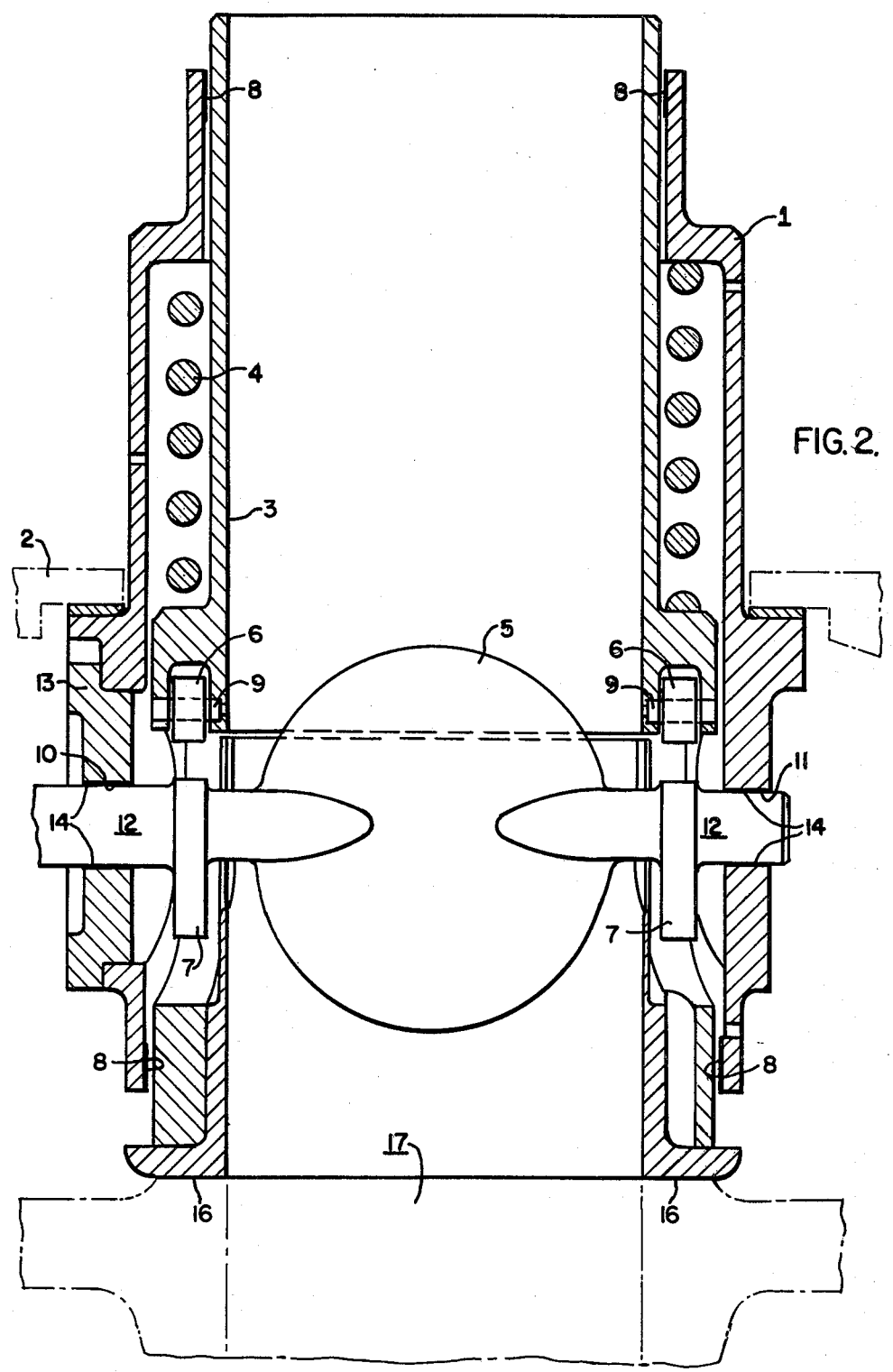
FIGS. 2 to 4 are sections of a preferred embodiment of the valve.
Figure 3:
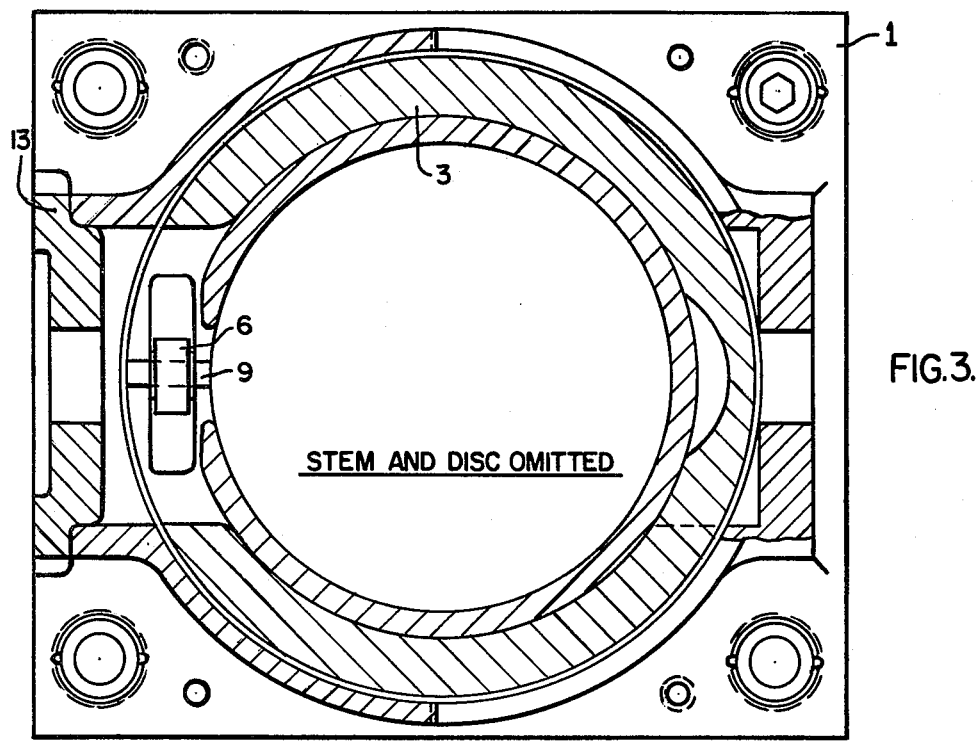

Refer to FIGS. 2 and 3. These are sections of the valve which show butterfly valve disc 5 in an open position, disposed to pass sodium flow. The valve is encased by a valve body 1 which is mounted to and supported by a pump support cylinder 2.

Valve body 1 has penetrations 10 and 11 for a valve shaft 12 at the top and bottom. Bottom penetration 11 is lined with stellite and provides a radial bearing for shaft 12. Upper penetration 10 is covered by a bearing housing 13 which also has a stellite coated bearing. The inside surface of valve body 1 has stellite coated 1-inch wide bands 8 at both ends. These bands 8 provide bearing surfaces for a valve cylinder 3.

Valve cylinder 3 is located inside valve body 1, with a valve spring 4 captured between valve body 1 and valve cylinder 3. Two rollers 6 and pins 9 are mounted in valve cylinder 3 to provide reduced friction during operation of cams 7. Valve cylinder 3 also has 3-inch wide bands of stellite on the outside surface at both ends to reduce friction. These bands will slide on stellite surfaces 8 on valve body 1. Rollers 6 and pins 9 are manufactured from stellite to provide low friction and preclude self welding.

Butterfly 5 is a circular disc which is located 0.25 inch eccentric to the centerline of shaft 12. This eccentricity will generate a hydraulic torque on butterfly 5 which will tend to open the valve during pump operation. A failure condition for shaft 12 will accordingly result in the valve going fully open, instead of closed, which would be the failure mode of a symmetric butterfly. Cams 7 are circular discs located eccentric on shaft 12. These will provide approximately 1.0 inch travel of valve cylinder 3 from the nominal sealed position during operation. Upper and lower shaft journals 14 are stellite coated to provide wear resistance for long term operation in sodium. Butterfly disc 5 has no seat but effects a variable hydraulic impedance by mere disposition in the fluid stream.

The valve is approximately rigid with respect to pump tank 15 because the valve is supported by valve body 1 which is affixed to pump support cylinder 2. However, vibrational motion between pump tank 15 and pump support cylinder 2 causes valve cylinder 3 to slide in valve body 1, maintaining integrity of the seal at junction 16 between tank nozzle 17 and valve cylinder 3 due to the action of spring 4.

Figure 4:
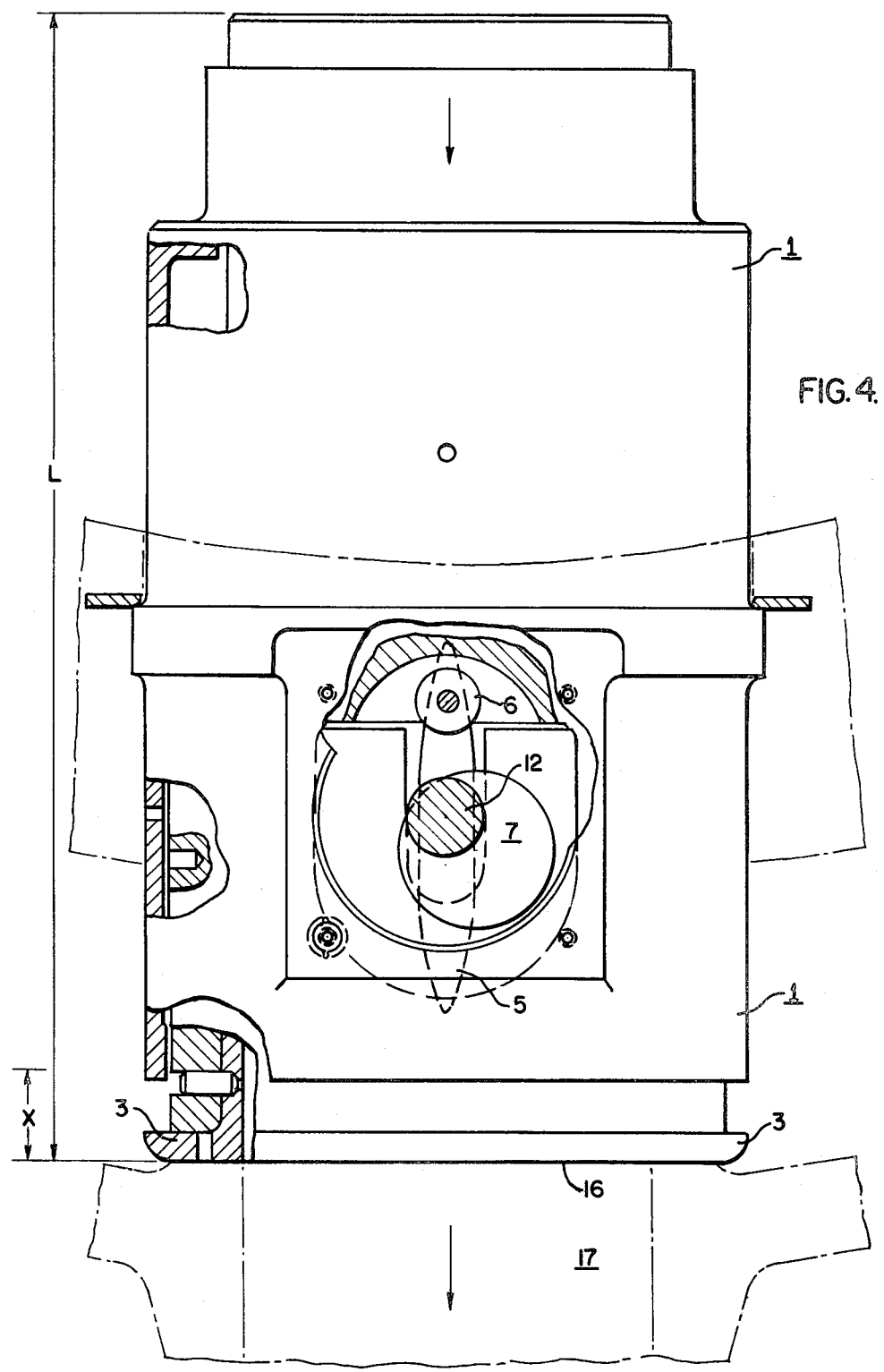

Refer to FIG. 4. Cams 7 are disposed on shaft 12 such that the surface of cam 7 bears on roller 6, applying a force thereto during a portion of the arc of circular rotation of shaft 12. This action of cam 7 (see FIG. 1) will retract valve cylinder 3 away from junction 16, breaking the seal and reducing the overall valve length "L" by an amount "X", about one inch. In the retracted position, the valve is free for easy removal from tank 15 (FIG. 1).

Figure 5:
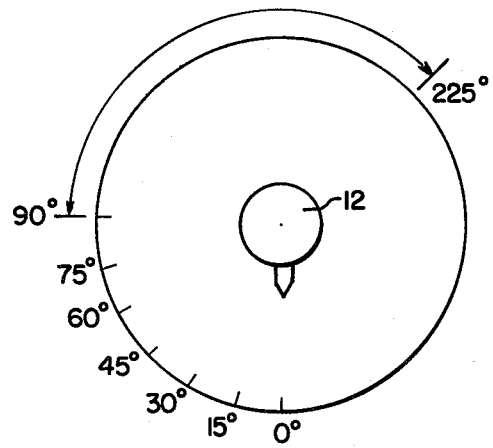
FIG. 5 is a schematic indicating the means of valve control by shaft rotation.

The upper regions of shaft 12 may have a circular plate scribed with angular delineations as illustrated in FIG. 5. A 90° range of shaft 12 circular rotation is sufficient to encompass complete butterfly disc 5 (FIG. 2) travel from fully open to fully closed. The fully open position has been arbitrarily assigned 0° in FIG. 5, and results in a counterclockwise position at 90° being fully closed. Valve cylinder 3 is fully extended in this range because cams 7 do not bear on rollers 6 from 0° to 90°. Further rotation beyond 90° brings cams 7 into contact with rollers 6 and begins to retract valve cylinder 3, compressing spring 4. Rotation to 225° in FIG. 5 is sufficient to fully retract valve cylinder 3. Shaft 12 may be provided with ratchets and retaining locks at intervals as desired. For example, a lock at 225° may be desired to maintain the retracted configuration during valve removal.

Figure 6:
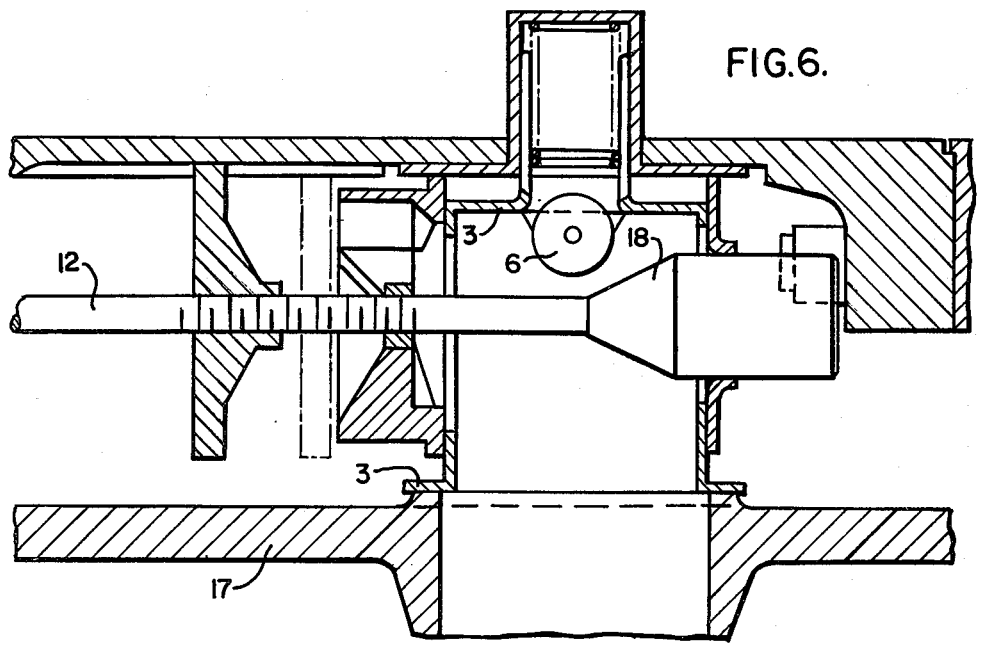
FIG. 6 is a section of a second embodiment of the valve.

Refer to FIG. 6, which is a section of a second embodiment of the valve in which cylinder retraction is done by shaft movement in a direction which is axial to the shaft rather than radial. Cone 18 at the lower portion of shaft 12 engages roller 6 and moves spring loaded valve cylinder 3 away from tank nozzle 17. The valve disc adjustment for this concept is accomplished by shaft rotation.

Figure 7:
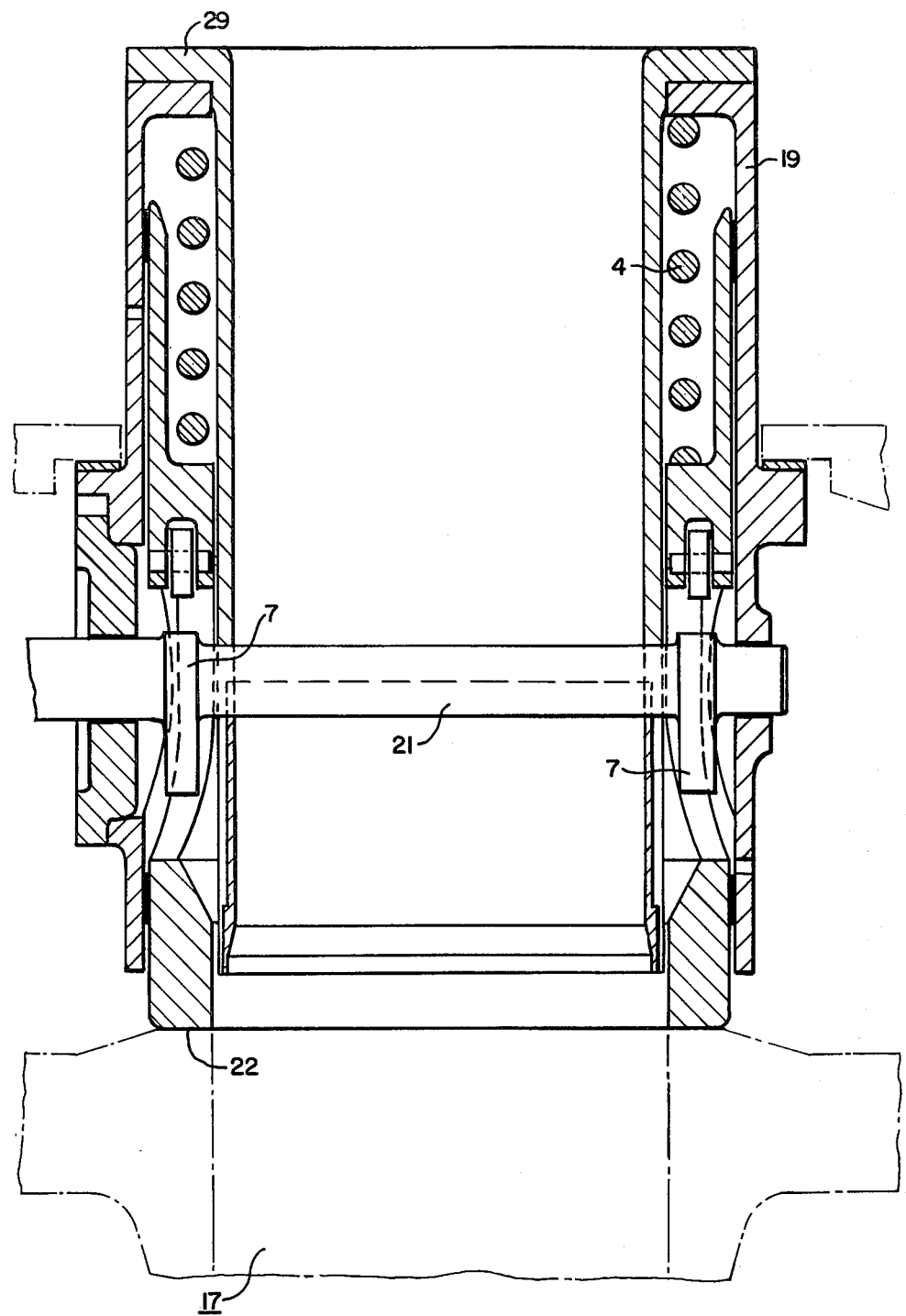
FIG. 7 is a sectioned view of a third embodiment of the invention.

The scope of this invention is not limited to an overflow control valve but can be a device for many functions, useful anywhere a seal is to be made between a removable device and a wall or valve seat. FIG. 7 is an example of a third embodiment of the invention in which the device is useful as a sealing unit having a device body 19, device cylinder 20, device shaft 21, and device seating surface 22. Other components are numbered as in FIG. 2. FIG. 7 also illustrates a refinement which is intended to minimize coolant leakage in the area around the shaft 21 penetrations. Device cylinder 20 contains a liner 29 which is attached to device body 19 and which surrounds shaft 21 closely. Liner 29 reduces coolant leakage at shaft 21 penetrations. While shown in FIG. 7 applied to a device adapted for use as a seal at surface 22, naturally liner 29 can be used with the configuration shown in FIG. 2 in which a valve is disclosed.

Numerous modifications can be made to the valve as disclosed in the specification and drawings without departure from the true spirit and scope of the invention. For example, numerous means for controlled motion of the valve cylinder other than shaft axial or rotational motion can be envisioned. The valve cylinder could have a separate actuating shaft. Therefore the disclosure should be interpreted as illustrative rather than limiting.

We claim:

1. In combination with a pump for use with liquid metal, said pump comprising a tank member which encloses the pump components, a pressure compartment within said tank member which encloses the pump impeller, an inlet liquid metal pipe sealed through said tank member and feeding into a bottom portion of said pressure compartment, an outlet liquid metal pipe sealed through a lower portion of said tank member and feeding from said pressure compartment, a liquid metal overflow reservoir in said tank member above said pressure compartment, an overflow pipe sealed through said tank member and connecting said overflow compartment to said inlet pipe exteriorly of said pump, an overflow valve means connecting said overflow compartment to said inlet pipe, and the top portion of said pump being removable from said tank member to repair and replace the internal pump components, the improved overflow valve means comprising:

(A) a valve body containing a movable valve disc;
(B) a spring-loaded valve cylinder within said valve body and movable with respect thereto,
(C) a valve seating surface fixed to the valve cylinder,
(D) means for controllably positioning said valve cylinder bringing said valve seating surface into and out of spring-loaded sealing contact with a seal surface and wherein said means for controllably positioning said valve cylinder is a rotating shaft which shaft moreover controls the position of said valve disc.

* * * * *